United States Patent
Hattori et al.

(10) Patent No.: US 11,326,244 B2
(45) Date of Patent: May 10, 2022

(54) STEEL MATERIAL FOR CVT SHEAVE, CVT SHEAVE, AND METHOD FOR MANUFACTURING CVT SHEAVE

(71) Applicants: AISIN CORPORATION, Kariya (JP); NIPPON STEEL & SUMITOMO METAL CORPORATION, Tokyo (JP)

(72) Inventors: Masashi Hattori, Anjo (JP); Kazumichi Tsukuda, Okazaki (JP); Hiroyuki Nozaki, Kariya (JP); Daisuke Kasai, Nukata (JP); Takuya Watanabe, Toyohashi (JP); Tetsuya Ohashi, Kitakyushu (JP); Shouji Toudou, Kitakyushu (JP); Akira Shiga, Muroran (JP)

(73) Assignees: AISIN CORPORATION, Kariya (JP); NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/310,946

(22) PCT Filed: Jul. 18, 2017

(86) PCT No.: PCT/JP2017/025875
§ 371 (c)(1),
(2) Date: Dec. 18, 2018

(87) PCT Pub. No.: WO2018/012636
PCT Pub. Date: Jan. 18, 2018

(65) Prior Publication Data
US 2020/0370159 A1    Nov. 26, 2020

(30) Foreign Application Priority Data

Jul. 15, 2016    (JP) .............................. JP2016-140740

(51) Int. Cl.
*C23C 8/22*    (2006.01)
*C22C 38/00*    (2006.01)
(Continued)

(52) U.S. Cl.
CPC .............. *C23C 8/22* (2013.01); *C22C 38/001* (2013.01); *C22C 38/002* (2013.01); *C22C 38/02* (2013.01);
(Continued)

(58) Field of Classification Search
CPC ......... C23C 8/22; C22C 38/001; C22C 38/02; C22C 38/04; C22C 38/20; C22C 38/002; C22C 38/40; F16H 55/56
See application file for complete search history.

(56) References Cited

U.S. PATENT DOCUMENTS

2009/0301608 A1* 12/2009 Taniguchi ............. C22C 38/001
148/319
2012/0018050 A1*  1/2012 Kubota ..................... C21D 9/32
148/219

(Continued)

FOREIGN PATENT DOCUMENTS

JP    2001-200348 A    7/2001
JP    2005-68482 A     3/2005
(Continued)

OTHER PUBLICATIONS

WO2015147067A1 English (Year: 2020).*
(Continued)

*Primary Examiner* — Robert S Jones, Jr.
*Assistant Examiner* — Jiangtian Xu
(74) *Attorney, Agent, or Firm* — Oliff PLC

(57) ABSTRACT

Steel materials for continuously variable transmissions sheaves, and methods for manufacturing a continuously variable transmission sheaves, are provided. In the disclosed steel materials for continuously variable transmission sheaves, the steel materials satisfy the following expressions: $13.9 \leq Fn1 \leq 15.5$, and $1.20 \leq Fn2 \leq 4.35$ (in which $Fn1 = 7 \times Cr - 6 \times Si + 4 \times Mn$; and $Fn2 = Al \times N \times 10^4$).

10 Claims, 3 Drawing Sheets

(51) Int. Cl.
  *C22C 38/02* (2006.01)
  *C22C 38/04* (2006.01)
  *C22C 38/06* (2006.01)
  *C22C 38/20* (2006.01)
  *C22C 38/40* (2006.01)
  *F16H 55/56* (2006.01)

(52) U.S. Cl.
  CPC .............. *C22C 38/04* (2013.01); *C22C 38/06* (2013.01); *C22C 38/20* (2013.01); *C22C 38/40* (2013.01); *F16H 55/56* (2013.01)

(56) References Cited

U.S. PATENT DOCUMENTS

| | | | | |
|---|---|---|---|---|
| 2013/0273393 | A1* | 10/2013 | Imataka | C22C 38/22 428/684 |
| 2013/0288838 | A1* | 10/2013 | Kato | C21D 9/0068 474/166 |

FOREIGN PATENT DOCUMENTS

| | | |
|---|---|---|
| JP | 2009-68609 A | 4/2009 |
| JP | 2012-036495 A | 2/2012 |
| JP | 2013-227607 A | 11/2013 |
| JP | 2016-19432 A | 2/2016 |
| WO | 2006/118243 A1 | 11/2006 |
| WO | WO-2015147067 A1 * 10/2015 ............. C22C 38/44 |

OTHER PUBLICATIONS

Northwood et al ("Retained Austenite—Residual Stress—Distortion, Relationships in Carburized SAE 8620 Steel", Materials Science Forum vols. 539-543, 2007, pp. 4464-4469). (Year: 2007).*

Oct. 10, 2017 International Search Report issued in International Patent Application No. PCT/JP2017/025875.

* cited by examiner

FIG. 2
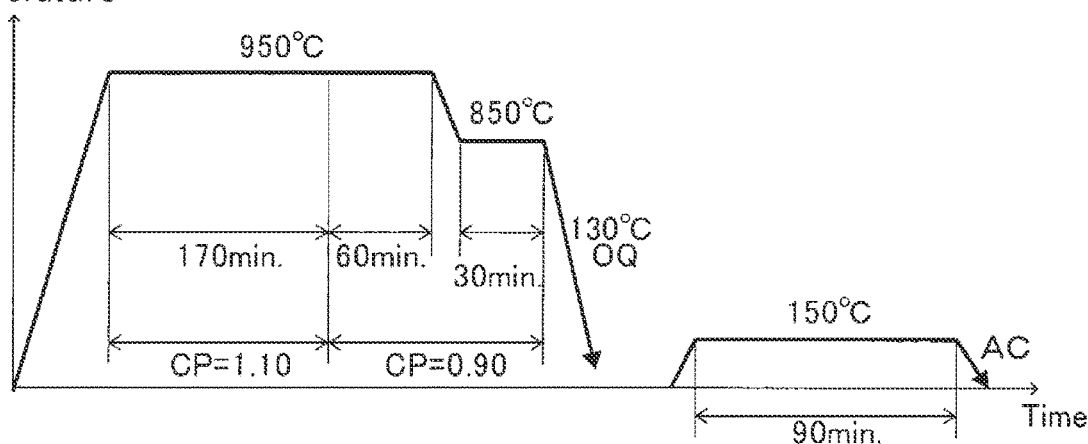
FIG. 3A  FIG. 3B
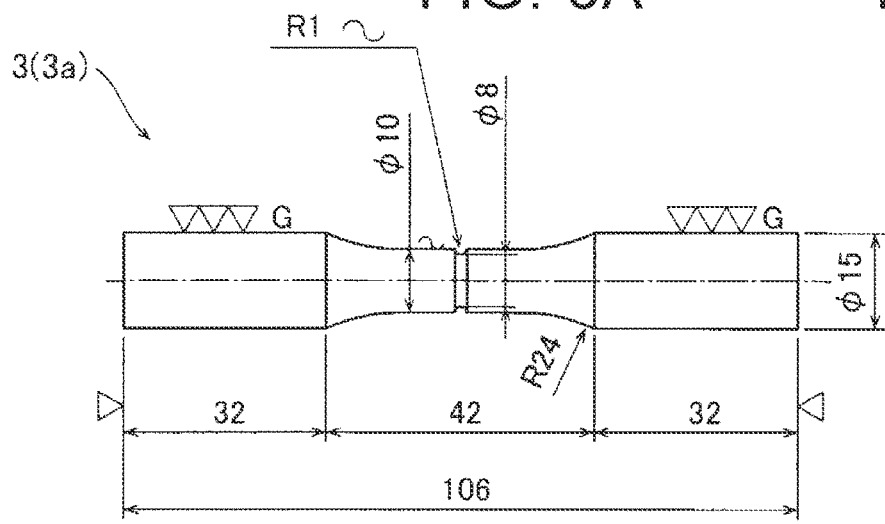
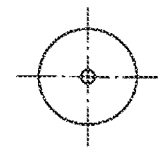
FIG. 4
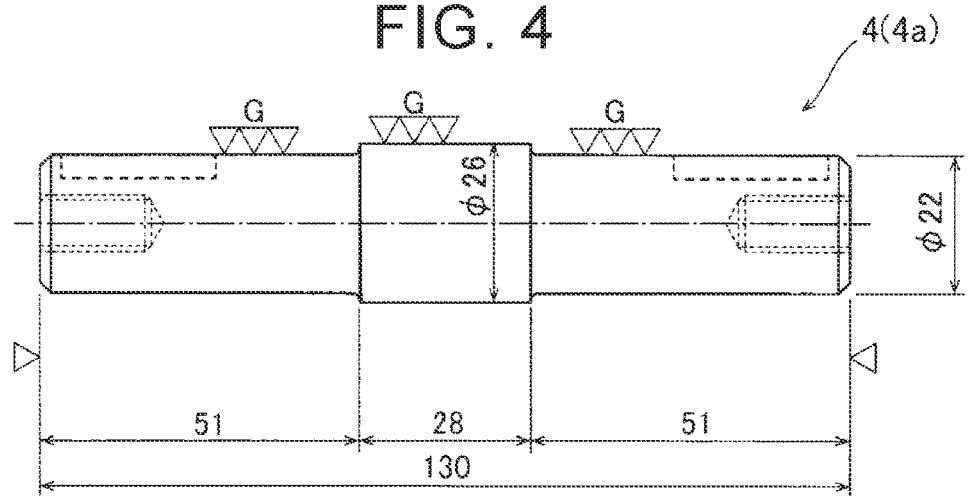

STEEL MATERIAL FOR CVT SHEAVE, CVT SHEAVE, AND METHOD FOR MANUFACTURING CVT SHEAVE

TECHNICAL FIELD

The present disclosure relates to steel materials for CVT sheaves which are raw steel for CVT sheaves that are used for continuously variable transmissions (CVTs), CVT sheaves using the steel material for CVT sheaves, and methods for manufacturing a CVT sheave.

BACKGROUND

In belt-type CVTs, a metal belt is wound between a pair of input-side and output-side sheaves and torque is transmitted while being shifted between the two sheaves, namely the input-side and the output-side sheaves, via the metal belt.

Since the metal belt contacts the sheave surfaces of the CVT sheaves (the sliding surfaces on which the metal belt slide), a high surface pressure is applied to the sheave surfaces, which tends to cause wear of the sheave surfaces. If the sheave surfaces become worn, transmission efficiency may be reduced or defective shifting may occur. Accordingly, the CVT sheaves are required to have high wear resistance and also required to have high bending fatigue strength so that they can resist a high surface pressure.

CVT sheaves are typically manufactured by forming a steel material into a predetermined shape by hot forging, cold forging, machining, etc., performing surface hardening such as carburizing and quenching, and then performing tempering and finishing such as polishing in order to improve fatigue strength and wear resistance. The "carburizing and quenching" is a process using low-carbon case hardening steel as raw steel. In the process carbon (C) is caused to enter the steel and diffused therein in an austenite range equal to or higher than Ac3, and then the steel is quenched.

Especially in recent years, there has been a growing demand for higher torque belt CVTs with an increased ratio coverage, and wear resistance and bending fatigue strength of CVT sheaves have been increasingly becoming important. Accordingly, CVT sheaves having high wear resistance and high bending fatigue strength have been desired.

Conventionally, CVT sheaves are known in the art which uses a steel material for CVT sheaves containing predetermined chemical components and which has improved wear resistance of a sliding surface on which a CVT belt slides. Such CVT sheaves are disclosed in, e.g., Japanese Patent Application Publication No. 2009-68609 (JP 2009-68609 A).

Japanese Patent Application Publication No. 2009-68609 (JP 2009-68609 A) discloses a pulley (a pair of CVT sheaves) for continuously variable transmissions which uses a steel material selected from chromium steel or chromium molybdenum steel defined in JIS G 4053 (2008). In the pulley for continuously variable transmissions disclosed in Japanese Patent Application Publication No. 2009-68609 (JP 2009-68609 A), carburizing and quenching and shot peening are performed so that sliding surfaces on which a metal belt slide have surface hardness as high as 800 HV or more (in examples, 878 to 1,015 HV) and residual compressive stress as high as 1,200 MPa or more (in the examples, 1,250 to 1,459 MPa) is applied to the sliding surfaces. In the pulley for continuously variable transmissions disclosed in Japanese Patent Application Publication No. 2009-68609 (JP 2009-68609 A), wear resistance of the sliding surfaces is improved, and even if cracks appear, further development of the cracks is restrained.

SUMMARY

With the chromium steel or chromium molybdenum steel defined in JIS G 4053 (2008), which are disclosed in Japanese Patent Application Publication No. 2009-68609 (JP 2009-68609 A), it is difficult to achieve wear resistance and bending fatigue strength for high torque applications that have been desired in recent years. Accordingly, in Japanese Patent Application Publication No. 2009-68609 (JP 2009-68609 A), carburizing and quenching and shot peening are performed so that the sliding surfaces on which the metal belt slide have surface hardness as high as 800 HV or more (in the examples, 878 to 1,015 HV) and residual compressive stress as high as 1,200 MPa or more (in the examples, 1,250 to 1,459 MPa) is applied to the sliding surfaces in order to respond to the demand. However, Japanese Patent Application Publication No. 2009-68609 (JP 2009-68609 A) has various problems as described below.

As described above, in order to provide slidability between CVT sheaves and a metal belt, the sheave surfaces (sliding surfaces) are typically finished such as polishing after carburizing, quenching, and tempering so as to have predetermined surface roughness. The sliding surfaces disclosed in Japanese Patent Application Publication No. 2009-68609 (JP 2009-68609 A) has very high hardness as described above. Accordingly, machining resistance during finishing is high, and therefore considerably high machining heat is generated during finishing. The sliding surfaces are therefore partially annealed, which results in reduction in hardness. In this case, not only wear develops from the portion with the reduced hardness, but also bending fatigue strength is reduced.

In Japanese Patent Application Publication No. 2009-68609 (JP 2009-68609 A), shot peening is performed to significantly increase hardness of the sliding surfaces and to apply high residual compressive stress to the sliding surfaces. If shot peening is performed after finishing, this means that finishing is performed before hardness of the sliding surfaces is increased. In this case, the problem of reduction in hardness due to machining heat is less significant. However, if shot peening that significantly increases hardness and applies high residual compressive stress is performed after finishing, such shot peening may adversely affect surface roughness of the surfaces obtained by finishing. It is therefore very difficult to set and manage the conditions for avoiding such a risk.

Japanese Patent Application Publication No. 2009-68609 (JP 2009-68609 A) suggests that the Si, Mn, and Mo contents are increased in order to obtain desired surface hardness. However, as described below, high Si and Mn contents increase the depth of an abnormal carburized layer, which causes reduction in bending fatigue strength etc. Increasing the Mo content also causes an increase in component cost.

An exemplary aspect of the embodiments of the present disclosure is to provide a steel material for CVT sheaves which can easily have high wear resistance and bending fatigue strength at low component cost, and to provide a CVT sheave using this steel material and a method for manufacturing the CVT sheave.

The inventors conducted intensive studies of the above problems (tasks) and found that the above problems can be solved by adjusting the silicon (Si), Cr (chromium), and manganese (Mn) contents to appropriate ranges while increasing the Cr content in a steel material for a CVT sheave.

A steel material for a CVT sheave according to a first aspect of the present disclosure is characterized in that the steel material contains the following chemical components: carbon (C): 0.15 mass % or more and 0.20 mass % or less, silicon (Si): 0.16 mass % or more and 0.30 mass % or less, manganese (Mn): 0.70 mass % or more and 0.90 mass % or less, sulfur (S): 0.010 mass % or more and 0.025 mass % or less, chromium (Cr): 1.80 mass % or more and 1.90 mass % or less, aluminum (Al): 0.015 mass % or more and 0.035 mass % or less, and nitrogen (N): 0.008 mass % or more and 0.017 mass % or less, Si, Mn, and Cr contents satisfy the above ranges and Fn1 defined by the following expression (1) satisfies 13.9≤Fn1≤15.5, Al and N contents satisfy the above ranges and Fn2 defined by the following expression (2) satisfies 1.20≤Fn2≤4.35, and a remainder is iron (Fe) and incidental impurities, and of the incidental impurities, phosphorus (P) and oxygen (O) contents are as follows: phosphorus (P): 0.030 mass % or less, and oxygen (O): 0.0020 mass % or less, $$Fn1 = 7 \times Cr - 6 \times Si + 4 \times Mn \quad (1)$$

$$Fn2 = Al \times N \times 10^4 \quad (2)$$

"Cr," "Si," and "Mn" in the expression (1) represent Cr, Si, and Mn contents in mass percent, and "Al" and "N" in the expression (2) represent Al and N contents in mass percent.

Since the steel material for a CVT sheave according to the first aspect of the present disclosure has the above composition, the steel material for a CVT sheave has appropriate contents of the chemical components for hardenability, whereby hardenability is improved. Accordingly, an inexpensive steel material having high bending fatigue strength and wear resistance without containing Mo, which is an expensive element, can be provided.

In the steel material for a CVT sheave, Fn1 defined by the expression (1) satisfies 13.9≤Fn1. This ensures that a sufficient amount of retrained austenite is present to a sufficient depth position (e.g., to 100 μm in the depth direction from a sliding surface) after carburizing, quenching, and tempering. Since there is a sufficient amount of retrained austenite, the retained austenite is transformed into strain-induced martensite and hardness is increased when a surface pressure is applied to the sliding surface. Accordingly, wear resistance of the sliding surface is more effectively improved.

Since Fn1 defined by the expression (1) satisfies Fn1≤15.5, formation of an excessive amount of retrained austenite in the surface region is restrained and excessive reduction in surface hardness is therefore restrained. Accordingly, reduction in bending fatigue strength of the CVT sheave is restrained.

A CVT sheave according to a second aspect of the present disclosure is a CVT sheave formed by using the steel material for a CVT sheave according to the first aspect as raw steel. Vickers hardness in a surface region from a sliding surface on which a CVT belt slides to 100 μm in a depth direction is 680 HV or more and 800 HV or less, and a volume fraction of retained austenite in the surface region is 13% or more and 28% or less.

In the CVT sheave according to the second aspect of the present disclosure, using the steel material for a CVT sheave according to the first aspect as raw steel enables the CVT sheave to have a sufficiently high volume fraction of retained austenite, namely 13% or more, in the region from the sliding surface to a sufficiently deep position, namely to 100 μm, in the depth direction, and restrains the volume fraction of retained austenite from being increased to more than 28%. As a result, when a surface pressure is applied to the sliding surface, the retained austenite is transformed into strain-induced martensite and hardness is increased. Accordingly, wear resistance of the sliding surface is more effectively improved. Moreover, bending fatigue strength of the CVT sheave is restrained from being reduced by reduction in surface hardness which is caused by an excessive amount of retained austenite in the surface region.

In the CVT sheave according to the second aspect, using the steel material for a CVT sheave according to the first aspect as raw steel easily allows the CVT sheave to have Vickers hardness of 680 HV or more and 800 HV or less in the surface region. Vickers hardness of 680 HV or more restrains reduction in wear resistance and bending fatigue strength, and Vickers hardness of 800 HV or less restrains an increase in grinding resistance during finishing such as polishing, facilitates manufacturing of the CVT sheave, restrains machining heat, and restrains reduction in hardness in a part of the CVT sheave.

A method for manufacturing a CVT sheave according to a third aspect of the present disclosure includes: processing the steel material for a CVT sheave according to the first aspect into a predetermined shape; and gas carburizing a processed workpiece with a carbon potential (CP) of 0.70 mass % or more and 1.10 mass % or less. The carbon potential (CP) is the C concentration in an equilibrium reaction in a carburizing furnace that is used for carburizing.

In the method for manufacturing a CVT sheave according to the third aspect of the present disclosure, the workpiece processed into the predetermined shape is gas carburized with a carbon potential (CP) of 0.70 mass % or more and 1.10 mass % or less. Since the CP is 0.70 mass % or more, a sufficient amount of C enters the processed workpiece. This ensures that the volume fraction of retained austenite after subsequent quenching and tempering is as high as 13% or more in the entire surface region, and restrains Vickers hardness in the surface region from being reduced to less than 680 HV. Since the CP is 1.10 mass % or less, the volume fraction of retained austenite after subsequent quenching and tempering is restrained from becoming higher than 28% in the entire surface region, and Vickers hardness in the surface region is restrained from being increased to more than 800 HV. Since C easily enters the corners of the workpiece during carburizing, the amount of C tends to be excessive in the corners of the workpiece. However, since the CP is in the above range, C is restrained from excessively entering the corners of the workpiece. This restrains formation of a large amount of coarse network cementite in the corners of the workpiece and thus restrains reduction in bending fatigue strength of the CVT sheave.

According to the present disclosure, as described above, a steel material for a CVT sheave which can easily provide high wear resistance and bending fatigue strength while reducing the component cost, and a CVT sheave using the steel material, and a method for manufacturing a CVT sheave can be provided.

BRIEF DESCRIPTION OF THE DRAWINGS

FIG. 2 is a graph showing a heat pattern of heat treatment for Examples 1 to 18 and Comparative Examples 1 to 9.

FIG. 3 shows views of a test piece for an Ono's rotary bending fatigue strength test.

FIG. 4 shows views of a small roller test piece for a roller pitting test.

DETAILED DESCRIPTION OF EMBODIMENTS

Figure 1:
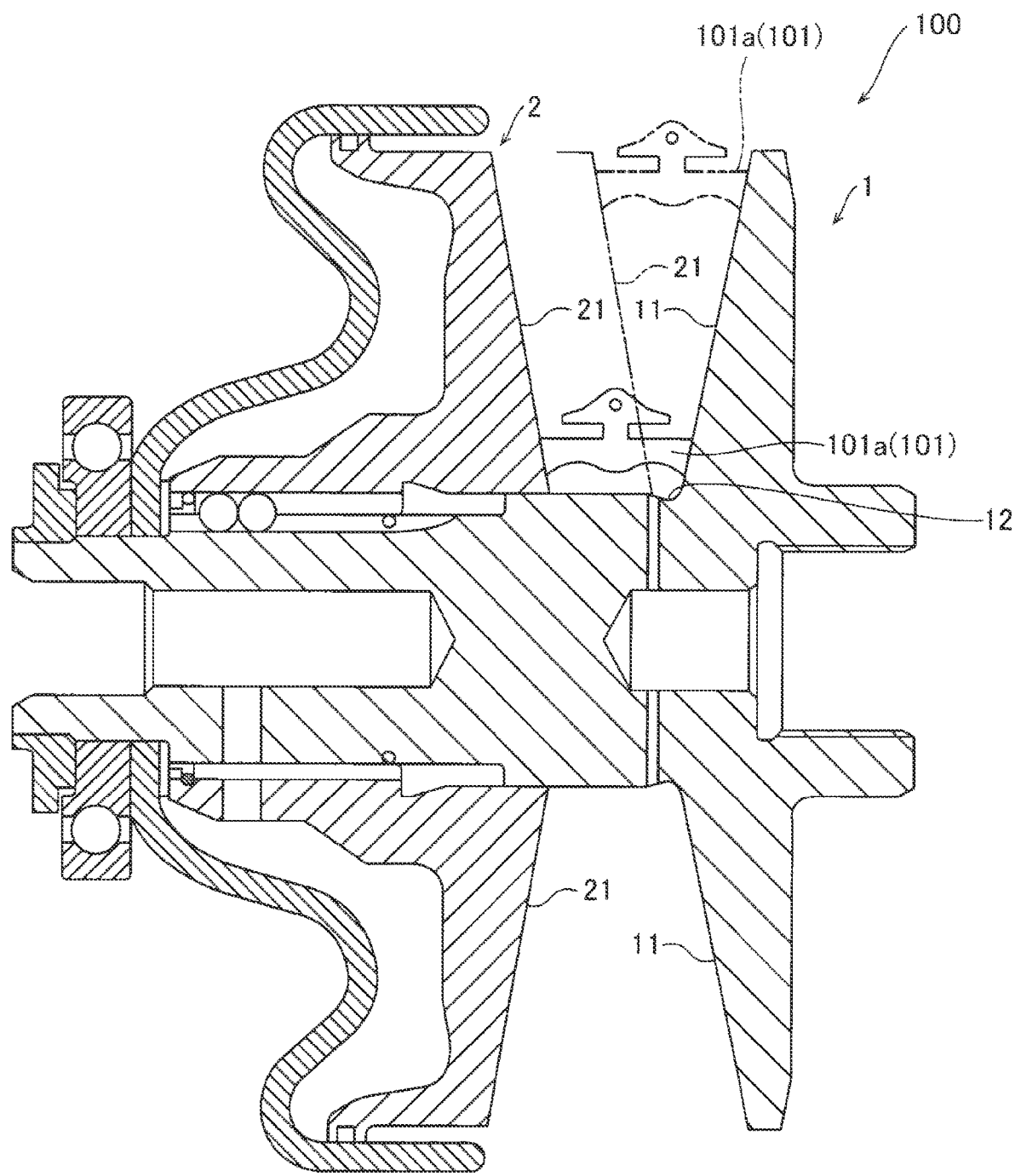
FIG. 1 is a sectional view of an input-side pulley device according to an embodiment of the present disclosure.

Exemplary embodiments of the present disclosure will be described below.

[Composition of Steel Material for CVT Sheaves]

First, the composition of a steel material for CVT sheaves according to an exemplary embodiment of the present disclosure will be described.

(Carbon (C): 0.15 Mass % or More and 0.20 Mass % or Less)

C is an element that is added to enable CVT sheaves to have sufficient strength (mechanical strength). The lower limit of the C content is set to 0.15 mass % to enable CVT sheaves to have sufficient strength. If the C content is higher than 0.20 mass %, the steel material for CVT sheaves is harder than necessary. The steel material for CVT sheaves is therefore less machinable and is less workable at the time of producing CVT sheaves. If the C content is higher than 0.20 mass %, the steel material for CVT sheaves has high core hardness after carburizing, quenching, and tempering described below, and cracks are more likely to be developed during bend straightening etc. The upper limit of the C content is therefore set to 0.20 mass %. The C content is more preferably in the range of 0.15 mass % or more and 0.19 mass % or less. The C content in the range of 0.16 mass % or more and 0.18 mass % or less is even more preferable in order to enable CVT sheaves to have sufficient strength and in terms of workability.

(Silicon (Si): 0.16 Mass % or More and 0.30 Mass % or Less)

Si is an element that is added to improve hardenability (how easily the steel material for CVT sheaves can be hardened by quenching), to improve temper softening resistance (the ability to restrain softening of the steel material for CVT sheaves by tempering), and for deoxidization. In order to obtain these effects, the Si content needs to be 0.16 mass % or more. If the Si content is higher than 0.30 mass %, the steel material for CVT sheaves is harder than necessary. The steel material for CVT sheaves is therefore less machinable. Moreover, since a large amount of Si oxide is produced at the surface during a carburizing process, an abnormal carburized layer has a greater depth, reducing bending fatigue strength of CVT sheaves. The upper limit of the Si content is therefore set to 0.30 mass %. The Si content in the range of 0.21 mass % or more and 0.29 mass % or less is more preferable in order to improve hardenability, to improve temper softening resistance, to restrain reduction in machinability, and to provide sufficient bending fatigue strength.

(Manganese (Mn): 0.70 Mass % or More and 0.90 Mass % or Less)

Mn is an element that is effective in improving hardenability and in deoxidization. In order to obtain these effects, the Mn content needs to be 0.70 mass % or more. If the Mn content is higher than 0.90 mass %, the steel material for CVT sheaves is harder than necessary. The steel material for CVT sheaves is therefore less machinable. Moreover, since a large amount of Mn oxide is produced at the surface during a carburizing process, an abnormal carburized layer has a greater depth, reducing bending fatigue strength of CVT sheaves. The upper limit of the Mn content is therefore set to 0.90 mass %. The Mn content in the range of 0.70 mass % or more and 0.85 mass % or less is more preferable in order to restrain reduction in machinability and to provide sufficient bending fatigue strength.

(Sulfur (S): 0.010 Mass % or More and 0.025 Mass % or Less)

S forms MnS in the steel material for CVT sheaves. S is therefore an element that is effective in improving machinability of the steel material for CVT sheaves. In order to obtain this effect, the S content needs to be 0.010 mass % or more. However, if the S content is higher than 0.025 mass %, coarse MnS is formed in the steel material for CVT sheaves, which reduces bending fatigue strength. The upper limit of the S content is therefore set to 0.025 mass %. The S content in the range of 0.012 mass % or more and 0.023 mass % or less is more preferable in order to improve machinability of the steel material for CVT sheaves and to provide sufficient bending fatigue strength.

(Chromium (Cr): 1.80 Mass % or More and 1.90 Mass % or Less)

Cr is an element that is important to increase the volume fraction of retained austenite after carburizing, quenching, and tempering. Cr is also an element that is effective in improving hardenability. In order to obtain these effects, the Cr content needs to be 1.80 mass % or more. If the Cr content is higher than 1.90 mass %, the steel material for CVT sheaves is harder than necessary. The steel material for CVT sheaves is therefore less machinable. Since a large amount of Cr oxide is produced at the surface during a carburizing process, an abnormal carburized layer has a greater depth, reducing bending fatigue strength of CVT sheaves. Moreover, coarse network carbide (cementite) is precipitated along grain boundaries in the corners of a workpiece during the carburizing process, which reduces bending fatigue strength of CVT sheaves. The upper limit of the Cr content is therefore set to 1.90 mass %. The Cr content in the range of 1.80 mass % or more and 1.88 mass % or less is more preferable in order to improve bending fatigue strength.

(Aluminum (Al): 0.015 Mass % or More and 0.035 Mass % or Less)

Al is an element that is effective in deoxidization and in forming a nitride to refine grain size. In order to obtain these effects, the Al content needs to be 0.015 mass % or more. However, if the Al content is higher than 0.035 mass %, a coarse hard oxide is formed, which reduces machinability of the steel material for CVT sheaves and also reduces bending fatigue strength. The upper limit of the Al content is therefore set to 0.035 mass %. The Al content in the range of 0.015 mass % or more and 0.030 mass % or less is more preferable in order to enable the steel material for CVT sheaves to have sufficient machinability and to provide sufficient bending fatigue strength.

(Nitrogen (N): 0.008 Mass % or More and 0.017 Mass % or Less)

N is an element that is effective in forming various nitrides with Al etc. to refine grain size. In order to obtain this effect, the N content needs to be 0.008 mass % or more. However, if the N content is higher than 0.017 mass %, a coarse nitride is formed, which reduces toughness and forgeability of the steel material for CVT sheaves. The upper limit of the N content is therefore set to 0.017 mass %. A more preferable range of the N content in the steel material for CVT sheaves is 0.009 mass % or more and 0.015 mass % or less.

(Phosphorus (P): 0.030 Mass % or Less)

P is an element that is contained in the steel material for CVT sheaves as an incidental impurity. Since P segregates in grain boundaries and embrittles (reduces toughness of) the steel material for CVT sheaves, the P content needs to be minimized. Specifically, the P content needs to be as low as 0.030 mass % or less. The P content in the range of 0.020 mass % or less is more preferable in order to reduce embrittlement of the steel material for CVT sheaves.

(Oxygen (O): 0.0020 Mass % or Less)

O is an element that is contained in the steel material for CVT sheaves as an incidental impurity. Since O produces oxides with Si and Al and reduces machinability and bending fatigue strength, the O content needs to be minimized. Specifically, the O content needs to be as low as 0.0020 mass % or less. The O content in the range of 0.015 mass % or less is more preferable in order to restrain reduction in machinability of the steel material for CVT sheaves and reduction in bending fatigue strength.

(Fn1)

The Cr, Si, and Mn contents satisfy the ranges described above, and Fn1 defined by the following expression (1) satisfies $13.9 \leq Fn1 \leq 15.5$.

$$Fn1 = 7 \times Cr - 6 \times Si + 4 \times Mn \tag{1}$$

In the expression (1), "Cr," "Si," and "Mn" represent the Cr, Si, and Mn contents in mass percent.

In order to provide high wear resistance, a certain amount of retained austenite must be present at the surface after carburizing, quenching, and tempering without excessively reducing surface hardness. If the value of Fn1 defined by the expression (1) and representing the balance of the Si, Mn, Cr contents is smaller than 13.9, the amount of retained austenite after carburizing, quenching, and tempering is less than required, and sufficient wear resistance cannot be provided. If the value of Fn1 defined by the expression (1) is larger than 15.5, an excessive amount of retained austenite is present at the surface, causing reduction in surface hardness and reduction in bending fatigue strength. The value of Fn1 defined by the expression (1) is therefore set to $13.9 \leq Fn1 \leq 15.5$. In the case where higher bending fatigue strength is required, it is preferable that the upper limit of the value of Fn1 defined by the expression (1) be 15.3. A preferred range of the value of Fn1 defined by the expression (1) is therefore $13.9 \leq Fn1 \leq 15.3$.

In order to make the volume fraction of retained austenite closer to a preferred value, namely closer to 20%, it is preferable that Fn1 satisfy $14.1 \leq Fn1 \leq 15.2$. When Fn1 satisfies $14.1 \leq Fn1$, the volume fraction of retained austenite in a surface region can be 16% or more. When Fn1 satisfies $Fn1 \leq 15.2$, the volume fraction of retained austenite in the surface region can be 24% or less.

In order to make the volume fraction of retained austenite even closer to the preferred value, namely closer to 20%, it is more preferable that Fn1 satisfy $14.4 \leq Fn1 \leq 14.8$. When Fn1 satisfies $14.4 \leq Fn1$, the volume fraction of retained austenite in the surface region can be 18% or more. When Fn1 satisfies $Fn1 \leq 14.8$, the volume fraction of retained austenite in the surface region can be 20% or less.

(Fn2)

The Al and N contents satisfy the ranges described above, and Fn2 defined by the following expression (2) satisfies $1.20 \leq Fn2 \leq 4.35$.

$$Fn2 = Al \times N \times 10^4 \tag{2}$$

In the expression (2), "Al" and "N" represent the Al and N contents in mass percent.

Al and N, whose contents in mass percent are used as variables in the expression (2), are elements that affect grain size refinement. When Fn2 satisfies $1.20 \leq Fn2$, a sufficient amount of AlN that refines grain size can be precipitated. If Fn2 is smaller than 1.20, bending fatigue strength and wear resistance may be reduced. When Fn2 satisfies $Fn2 \leq 4.35$, AlN can be completely made to form a solid solution during heat treatment (e.g., hot rolling etc.). Accordingly, coarse AlN precipitated without forming a solid solution is restrained from remaining in the steel material for CVT sheaves. If Fn2 is larger than 4.35, bending fatigue strength may be reduced.

In terms of grain size refinement, it is preferable that Fn2 satisfy $1.35 \leq Fn2 \leq 4.35$.

The steel material for CVT sheaves may contain at least one element of the following element group as an optional component instead of a part of Fe.

Copper (Cu): 0.30 Mass % or Less
Nickel (Ni): 0.25 Mass % or Less

Cu is an element that is effective in improving hardenability. However, since Cu is an expensive element and excessive Cu content may cause reduction in hot workability, the steel material for CVT sheaves does not have to contain Cu. If Cu is contained in the steel material for CVT sheaves, the upper limit of the Cu content is 0.30 mass % in order to restrain an increase in cost and reduction in hot workability. In order to reliably improve hardenability, it is preferable that the Cu content be 0.05 mass % or more. In order to restrain an increase in cost and reduction in hot workability, it is preferable that the Cu content be 0.20 mass % or less.

Ni is an element that is effective in improving hardenability. Since Ni is a non-oxidative element, adding Ni does not increase the depth of a grain boundary oxide layer during a carburizing process and is less likely to reduce bending fatigue strength. However, since Ni is an expensive element and excessive Ni content may cause reduction in machinability, the steel material for CVT sheaves does not have to contain Ni. If Ni is contained in the steel material for CVT sheaves, the upper limit of the Ni content is 0.25 mass % in order to restrain an increase in cost and reduction in machinability. In order to reliably improve hardenability, it is preferable that the Ni content be 0.05 mass % or more. In order to restrain an increase in cost and reduction in machinability, it is preferable that the Ni content be 0.20 mass % or less.

[Structure of Input-Side Pulley Device]

Next, the structure of an input-side pulley device 100 for a CVT which includes a fixed sheave 1 and a movable sheave 2 using the steel material for CVT sheaves according to the embodiments of the present disclosure will be described with reference to FIG. 1. The fixed sheave 1 and the movable sheave 2 are examples of a "CVT sheave".

The input-side pulley device 100 for a CVT according to some of the embodiments of the present disclosure is configured to receive a driving force from an engine, not shown, and to transmit the driving force to an output-side pulley device, not shown, via a CVT belt 101 that is in contact with the input-side pulley device 100. The output-side pulley device has a configuration substantially similar to that of the input-side pulley device 100.

The input-side pulley device 100 includes the fixed sheave 1 and the movable sheave 2 that is movable in the X direction with respect to the fixed sheave 1. The fixed sheave 1 and the movable sheave 2 have sliding surfaces 11, 21, respectively. The sliding surfaces 11, 21 are disposed so as to face each other and are tilted so as to be separated from each other as they extend to the outside in the radial direction. The input-side pulley device 100 is configured so that the CVT belt 101 made of a metal is disposed between the sliding surfaces 11, 21 and elements 101a of the CVT belt 101 slide on the sliding surfaces 11, 21.

As the movable sheave 2 moves in the X direction, the positions of the sliding surfaces 11, 21 on which the elements 101a slide change in the radial direction. The winding diameter of the CVT belt 101 thus changes accordingly in the input-side pulley device 100 and the output-side pulley device, whereby the speed ratio is continuously changed in the CVT.

(Volume Fraction of Retained Austenite)

In some embodiments, the fixed sheave 1 is configured so that, in the sliding surface 11, the volume fraction of retained austenite in a surface region from the sliding surface 11 to 100 µm in the depth direction is 13% or more and 28% or less. Similarly, the movable sheave 2 is configured so that the volume fraction of retained austenite in a surface region from the sliding surface 21 to 100 µm in the depth direction is 13% or more and 28% or less. This configuration ensures that a sufficient amount of retained austenite is transformed into strain-induced martensite. In order to transform a more sufficient amount of retained austenite into strain-induced martensite, it is preferable that the volume fraction of retained austenite in the above surface region be 18% or more.

Since the volume fraction of retained austenite in the surface region is 28% or less, reduction in surface hardness due to an excessive amount of retained austenite is restrained, and reduction in bending fatigue strength is thus restrained. In order to sufficiently restrain reduction in bending fatigue strength, it is preferable that the volume fraction of retained austenite be 26% or less.

(Vickers Hardness)

The fixed sheave 1 is configured so that, in the sliding surface 11, Vickers hardness in the surface region from the sliding surface 11 to 100 µm in the depth direction is 680 HV or more and 800 HV or less. Similarly, the movable sheave 2 is configured so that Vickers hardness in the surface region from the sliding surface 21 to 100 µm in the depth direction is 680 HV or more and 800 HV or less. Since Vickers hardness in the surface region is 680 HV or more, sufficient bending fatigue strength and wear resistance are provided. In order to provide more sufficient bending fatigue strength and wear resistance, it is preferable that Vickers hardness in the surface region be 720 HV or more.

Since Vickers hardness in the surface region is 800 HV or less, an increase in grinding resistance during finishing such as polishing is restrained. Degradation in manufacturability due to an increase in grinding resistance is thus restrained. Moreover, the possibility that polishing burns may be caused by machining heat generated by an increase in grinding resistance is reduced. In order to reliably reduce the possibility of such polishing burns, it is preferable that Vickers hardness in the surface region be 780 HV or less.

In the fixed sheave 1, not only the sliding surface 11 but also a round root portion 12 etc. are repeatedly subjected to bending stress. Since, for example, Vickers hardness is also 680 HV or more in portions such as the round root portion 12, the fixed sheave 1 has sufficient bending fatigue strength.

[Manufacturing Method of Movable Sheave]

Next, a method for manufacturing the fixed sheave 1 according to some of the embodiments of the present disclosure will be described with reference to FIG. 1.

(Preparation and Preprocessing)

First, a steel bar material for CVT sheaves containing the above chemical components is prepared as raw steel. This steel bar material for CVT sheaves is subjected to hot forging, normalizing, roughing, etc. to produce a steel material for CVT sheaves roughly having a predetermined shape of the fixed sheave 1.

Since the steel material for CVT sheaves has improved forgeability and machinability due to the above predetermined composition ranges, processing such as hot forging and roughing can be easily performed.

(Gas Carburizing)

The workpiece is then gas carburized. The temperature in a carburizing furnace is kept higher than an austenite transformation point (Ac3). The structure of the workpiece is thus transformed into austenite (7).

In the manufacturing method of the embodiments of the present disclosure, the carbon potential (CP) in the carburizing furnace is set to 0.70 mass % or more and 1.10 mass % or less. In gas carburizing, the CP may be varied between gas carburizing and diffusion within this range. The gas carburizing time and the diffusion time are set as appropriate.

With the CP being 0.70 mass % or more, the surface region has a sufficiently high C concentration, which ensures that predetermined surface hardness is achieved and a predetermined amount of retained austenite is formed in the surface region. With the CP being 1.10 mass % or less, the C concentration in the surface region after gas carburizing is restrained from becoming too high. This enables the fixed sheave 1 to have sufficient wear resistance and bending fatigue strength.

The workpiece having been subjected to carburizing and diffusion is oil quenched. The workpiece is thus quench hardened, and hard martensite and retained austenite that is softer than martensite are formed in the surface region.

(Tempering and Finishing)

Thereafter, the workpiece is tempered. The resultant workpiece has Vickers hardness of 680 HV or more and 800 HV or less in the surface region.

The workpiece is then subjected to finishing such as polishing. Since the workpiece has Vickers hardness of 680 HV or more and 800 HV or less in the surface region, an increase in grinding resistance during finishing is restrained and degradation in manufacturability due to an increase in grinding resistance during finishing is thus restrained. Moreover, since the possibility that polishing burns may be caused by heat generated by an increase in grinding resistance is also reduced, reduction in surface hardness is restrained. As a result, the fixed sheave 1 is manufactured which has Vickers hardness of 680 HV or more and 800 HV or less in the surface region of the sliding surface 11 shown in FIG. 1 and in which the volume fraction of retained austenite in the surface region is 13% or more and 28% or less.

(When in Operation)

When the fixed sheave 1 manufactured as described above is in operation, a high surface pressure is applied from the elements 101a of the CVT belt 101 to the sliding surface 11. With this high surface pressure, the large amount of retained austenite formed in the surface region of the sliding surface 11 is transformed into martensite. Since a large amount of retained austenite is thus transformed into strain-induced martensite, hardness of the sliding surface 11 is increased significantly. Wear resistance of the sliding surface 11 is thus improved.

In the case where only a small amount of retained austenite is formed, only a small amount of strain-induced martensite is formed even if a high surface pressure is applied. Hardness of the sliding surface is therefore not increased so much. Accordingly, wear resistance of the sliding surface 11 is not improved so much.

The movable sheave 2 is manufactured by a process similar to that of the fixed sheave 1. The movable sheave 1 is thus manufactured which has Vickers hardness of 680 HV or more and 800 HV or less in the surface region and in which the volume fraction of retained austenite in the surface region is 13% or more and 28% or less.

In some of the embodiments of the present disclosure, a high surface pressure is applied when in operation. Such embodiments are therefore configured so that hardness of the sliding surface 11 of the fixed sheave 1 and hardness of the sliding surface 21 of the movable sheave 2 are increased by the high surface pressure when in operation. Accordingly, when the fixed sheave 1 and the movable sheave 2 are manufactured, surface hardness is not increased so much in order to improve workability such as grindability, and wear resistance of the sliding surface 11 of the fixed sheave 1 and wear resistance of the sliding surface 21 of the movable sheave 2 are improved when in operation.

In the fixed sheave 1 and the movable sheave 2, the sliding surfaces 11, 21 etc. are not subjected to work hardening such as shot peening. Accordingly, there is no need for strict management of conditions for work hardening and the manufacturing process of the fixed sheave 1 and the movable sheave 2 is restrained from becoming complicated.

The embodiments described in the present disclosure have the following effects.

In the embodiments of the present disclosure, since the steel material for CVT sheaves has the above composition, the steel material for CVT sheaves has appropriate contents of the chemical components for hardenability, whereby hardenability is improved. Accordingly, an inexpensive steel material having high bending fatigue strength and wear resistance without containing Mo, which is an expensive element, can be provided.

As described above, in the steel material for CVT sheaves of the embodiments of the present disclosure, Fn1 defined by the expression (1) satisfies 13.9≤Fn1. This ensures that the volume fraction of retained austenite after carburizing, quenching, and tempering is as high as 13% or more in the entire surface region. Accordingly, when a surface pressure is applied to the sliding surfaces 11, 21, retained austenite is transformed into strain-induced martensite, thereby increasing hardness. Wear resistance of the sliding surfaces 11, 21 is thus more effectively improved.

In the embodiments of the present disclosure, as described above, Fn1 satisfies Fn1≤15.5. This restrains the amount of retained austenite in the surface region from becoming too large and restrains excessive reduction in surface hardness. Reduction in bending fatigue strength of the fixed sheave 1 and the movable sheave 2 is thus restrained.

In the manufacturing method of the embodiments of the present disclosure, as described above, the processed workpiece is gas carburized with a carbon potential (CP) of 0.70 mass % or more and 1.10 mass % or less. Since the CP is 0.70 mass % or more, C enters the processed workpiece at a sufficiently high concentration. This ensures that the volume fraction of retained austenite after subsequent quenching and tempering is as high as 13% or more in the entire surface region, and restrains Vickers hardness in the surface region from being reduced to less than 680 HV. Since the CP is 1.10 mass % or less, the volume fraction of retained austenite after subsequent quenching and tempering is restrained from becoming higher than 28% in the entire surface region, and Vickers hardness in the surface region is restrained from being increased to more than 800 HV. Moreover, C is restrained from excessively entering the corners of the processed workpiece, namely the portions C is especially more likely to enter. This restrains formation of a large amount of coarse network cementite in the corners of the workpiece and thus restrains reduction in bending fatigue strength of the fixed sheave 1 and the movable sheave 2.

Examples

Next, examples will be described with respect to measurement of surface hardness, measurement of the volume fraction of retained austenite, measurement of bending fatigue strength, and measurement of wear resistance which were carried out in order to verify the effects of various embodiments of the present disclosure. In the examples, predetermined test pieces are produced with a plurality of steel materials for CVT sheaves having different contents of constituent elements, and tests were conducted on the test pieces.

(Preparation of Test Pieces of Examples and Comparative Examples)

First, a test piece of Example 1 was produced. Specifically, predetermined raw steel was melted in a vacuum melting furnace so as to contain chemical components of Example 1 shown in Table 1. Thereafter, the molten raw steel was cast into ingots of Example 1. After the ingots thus produced were held at 1,150° C. for two hours, hot forging was performed to produce steel bars with a diameter of 35 mm. The steel bars were held at 920° C. for one hour and then air-cooled to room temperature for normalizing.

Subsequently, test pieces before heat treatment (carburizing, quenching, and tempering) were produced from portions of the normalized steel bars which extended parallel to the longitudinal direction from the middle parts of the normalized steel bars. At this time, a notched test piece 3 for the Ono's rotary bending fatigue test which had a shape shown in FIG. 3 and a small roller test piece 4 for a roller pitting test which had a shape shown in FIG. 4 were produced as test pieces before heat treatment. FIG. 3A is a side view of the test piece 3 as viewed in a direction perpendicular to the axial direction thereof, and FIG. 3B is a front view of the test piece 3 as viewed in the axial direction. FIG. 4 is a side view of the small roller test piece 4 as viewed in a direction perpendicular to the axial direction thereof.

Figure 5A:
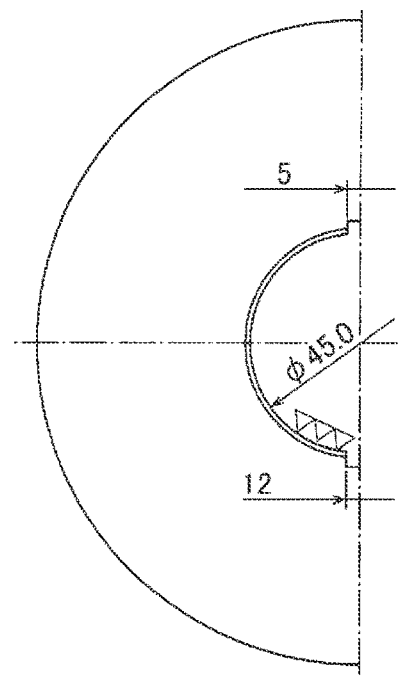
FIG. 5 shows views of a large roller test piece for a roller pitting test.
Figure 5B:
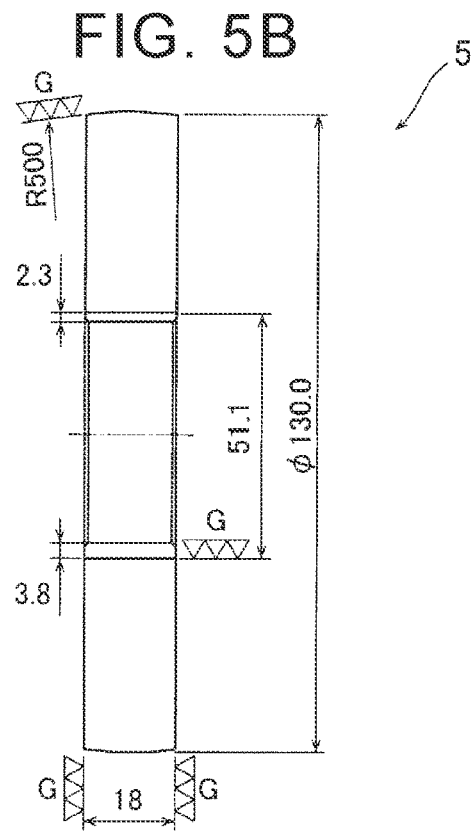

In addition to the above test pieces, a large roller test piece 5 for a roller pitting test which had a shape shown in FIG. 5 was produced from a normalized steel bar with a diameter of 140 mm which was made from a reference steel material shown in Table 2, namely steel corresponding to SCM420H defined in JIS G 4052 (2008). FIG. 5A is a front view of the large roller test piece as viewed in the axial direction thereof, and FIG. 5B is a side view of the large roller test piece as viewed in a direction perpendicular to the axial direction.

All of the dimensions of the test pieces shown in FIGS. 3 to 5 are shown in "millimeter," and the symbols "V" and "VVV" are "finish marks" representing surface roughness. The letter "G" after "VVV" is an abbreviation for the machining process "grinding."

The test piece 3, the small roller test piece 4, and the large roller test piece 5, which are test pieces before heat treatment, were subjected to heat treatment. At this time, heat treatment based on the above embodiment was performed according to a heat pattern shown in FIG. 2. That is, the test piece 3, the small roller test piece 4, and the large roller test piece 5 were gas carburized for 170 minutes in a carburizing furnace adjusted to 950° C. and CP=1.10 mass %. The carburizing furnace was then adjusted to 950° C. and CP=0.90 mass % and maintained for 60 minutes and thereafter was adjusted to 850° C. and CP=0.90 mass % and maintained for 30 minutes for diffusion. Subsequently, oil quenching (OQ) was performed with oil having a temperature of 130° C. for quenching. Lastly, the test piece and the small roller test piece were held for 90 minutes in a tempering furnace adjusted to 150° C. and then air-cooled (AC) for tempering.

The test piece 3 for the Ono's rotary bending fatigue test of Example 1 shown in FIG. 3, the small roller test piece 4 for the roller pitting test shown in FIG. 4, and the large roller test piece 5 for the roller pitting test shown in FIG. 5 were thus produced.

Test pieces 3 and small roller test pieces 4 containing chemical components of Examples 2 to 18 and Comparative Examples 1 to 9 shown in Table 1 were also produced in a manner similar to that of Example 1. The remainder other than the chemical components shown in Table 1 is Fe or incidental impurities.

Figure 6:
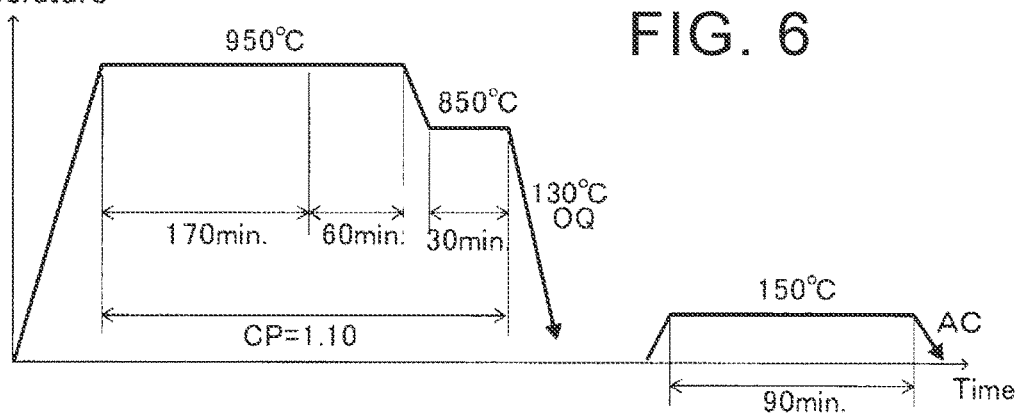
FIG. 6 is a graph showing a heat pattern of heat treatment for Example 19.
Figure 7:
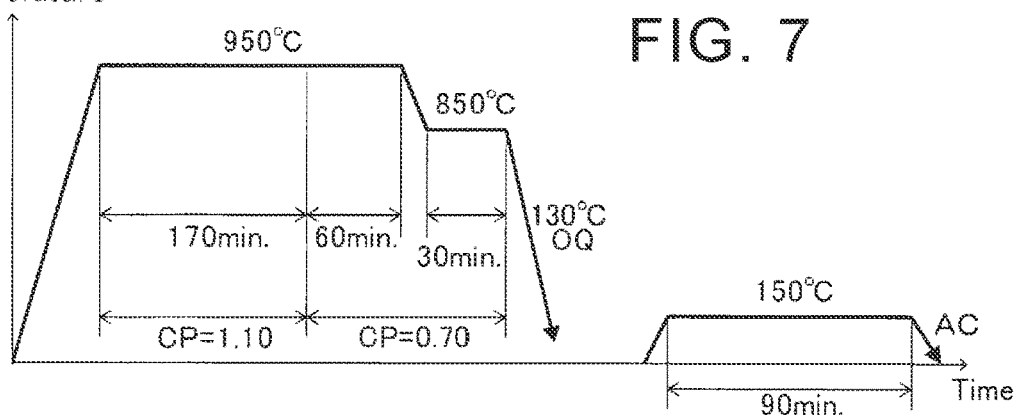
FIG. 7 is a graph showing a heat pattern of heat treatment for Example 20.

Test pieces 3 and small roller test pieces 4 of Examples 19 and 20 were also produced by using the same steel material for CVT sheaves as that of Example 1 and performing heat treatment based on the above embodiment according to heat patterns shown in FIGS. 6 and 7.

Specifically, in Example 19, gas carburization and diffusion for the test piece 3 and the small roller test piece 4 before heat treatment were performed for 230 minutes in a carburizing furnace adjusted to 950° C. and CP=1.10 mass %, and the carburizing furnace was then adjusted to 850° C. and CP=1.10 mass % and maintained for 30 minutes. Quenching and tempering were then performed under conditions similar to those of Example 1. The test piece 3 and the small roller test piece 4 of Example 19 were thus produced.

In Example 20, the test piece 3 and the small roller test piece 4 before heat treatment were gas carburized for 170 minutes in a carburizing furnace adjusted to 950° C. and CP=1.10 mass %. The carburizing furnace was then adjusted to 950° C. and CP=0.70 mass % and maintained for 60 minutes and thereafter was adjusted to 850° C. and CP=0.70 mass % and maintained for 30 minutes for diffusion. Quenching and tempering were then performed under conditions similar to those of Example 1. The test piece 3 and the small roller test piece 4 of Example 20 were thus produced.

TABLE 1

| | C | Si | Mn | Cr | S | Al | N | P | O | Cu | Ni |
|---|---|---|---|---|---|---|---|---|---|---|---|
| Example 1 | 0.17 | 0.25 | 0.77 | 1.85 | 0.015 | 0.025 | 0.010 | 0.011 | 0.0010 | — | — |
| Comparative Example 1 | 0.18 | 0.40 | 0.86 | 1.83 | 0.015 | 0.025 | 0.013 | 0.010 | 0.012 | — | — |
| Example 2 | 0.17 | 0.30 | 0.80 | 1.86 | 0.018 | 0.024 | 0.017 | 0.012 | 0.0014 | — | — |
| Example 3 | 0.18 | 0.16 | 0.80 | 1.83 | 0.016 | 0.018 | 0.016 | 0.010 | 0.0012 | — | — |
| Example 4 | 0.15 | 0.27 | 0.90 | 1.84 | 0.020 | 0.026 | 0.012 | 0.008 | 0.0009 | — | — |
| Example 5 | 0.19 | 0.23 | 0.70 | 1.87 | 0.013 | 0.026 | 0.010 | 0.008 | 0.0008 | — | — |
| Comparative Example 2 | 0.18 | 0.21 | 0.85 | 2.10 | 0.016 | 0.028 | 0.013 | 0.009 | 0.0007 | — | — |
| Example 6 | 0.18 | 0.24 | 0.85 | 1.90 | 0.010 | 0.025 | 0.011 | 0.010 | 0.0012 | — | — |
| Example 7 | 0.16 | 0.25 | 0.75 | 1.80 | 0.011 | 0.023 | 0.013 | 0.011 | 0.0011 | — | — |
| Comparative Example 3 | 0.17 | 0.22 | 0.79 | 1.55 | 0.020 | 0.020 | 0.013 | 0.013 | 0.0015 | — | — |
| Comparative Example 4 | 0.19 | 0.25 | 0.75 | 1.81 | 0.012 | 0.041 | 0.010 | 0.012 | 0.0018 | — | — |
| Example 8 | 0.18 | 0.22 | 0.79 | 1.85 | 0.016 | 0.035 | 0.012 | 0.011 | 0.0010 | — | — |
| Example 9 | 0.18 | 0.24 | 0.88 | 1.82 | 0.015 | 0.015 | 0.010 | 0.010 | 0.0008 | — | — |
| Example 10 | 0.20 | 0.24 | 0.82 | 1.84 | 0.020 | 0.025 | 0.017 | 0.014 | 0.0012 | — | — |
| Example 11 | 0.19 | 0.19 | 0.87 | 1.84 | 0.013 | 0.022 | 0.008 | 0.009 | 0.0010 | — | — |
| Comparative Example 5 | 0.17 | 0.28 | 0.76 | 1.80 | 0.016 | 0.029 | 0.007 | 0.010 | 0.0011 | — | — |
| Example 12 | 0.17 | 0.26 | 0.87 | 1.87 | 0.020 | 0.029 | 0.014 | 0.030 | 0.0015 | — | — |
| Comparative Example 6 | 0.17 | 0.16 | 0.89 | 1.90 | 0.020 | 0.022 | 0.015 | 0.014 | 0.0015 | — | — |
| Example 13 | 0.17 | 0.21 | 0.87 | 1.89 | 0.019 | 0.035 | 0.011 | 0.008 | 0.0010 | — | — |
| Example 14 | 0.18 | 0.29 | 0.75 | 1.81 | 0.025 | 0.028 | 0.014 | 0.011 | 0.0013 | — | — |
| Comparative Example 7 | 0.16 | 0.30 | 0.71 | 1.80 | 0.018 | 0.027 | 0.014 | 0.009 | 0.0009 | — | — |
| Comparative Example 8 | 0.17 | 0.27 | 0.73 | 1.81 | 0.015 | 0.034 | 0.017 | 0.016 | 0.0019 | — | — |
| Example 15 | 0.18 | 0.21 | 0.80 | 1.86 | 0.020 | 0.029 | 0.015 | 0.012 | 0.0013 | — | — |
| Example 16 | 0.17 | 0.28 | 0.81 | 1.85 | 0.012 | 0.015 | 0.008 | 0.006 | 0.0007 | — | — |
| Comparative Example 9 | 0.18 | 0.27 | 0.75 | 1.82 | 0.010 | 0.014 | 0.008 | 0.007 | 0.0008 | — | — |
| Example 17 | 0.16 | 0.26 | 0.82 | 1.84 | 0.020 | 0.019 | 0.015 | 0.013 | 0.0013 | 0.23 | — |
| Example 18 | 0.16 | 0.22 | 0.84 | 1.83 | 0.023 | 0.022 | 0.015 | 0.011 | 0.0011 | — | 0.21 |
| Example 19 | 0.17 | 0.25 | 0.77 | 1.85 | 0.015 | 0.025 | 0.010 | 0.011 | 0.0010 | — | — |
| Example 20 | 0.17 | 0.25 | 0.77 | 1.85 | 0.015 | 0.025 | 0.010 | 0.011 | 0.0010 | — | — |

(mass %)

(Measurement of Surface Hardness)

First, surface hardness was measured for the small roller test pieces 4 of Examples 1 to 20 and Comparative Examples 1 to 9. Specifically, the small roller test piece 4 was cut substantially in the middle in the axial direction, and a cut piece was embedded in a resin such that the cut surface was exposed to the outside. After the cut surface was mirror-polished, Vickers hardness of the surface was measured according to JIS Z2244 (2009).

That is, Vickers hardness was measured with a common micro Vickers hardness meter at desired five points at a depth position of 0.1 mm in the depth direction from the outer surface of the small roller test piece 4. The test force was 0.98 N. The arithmetic mean of the Vickers hardness values at the five points was calculated to evaluate Vickers hardness of Examples 1 to 20 and Comparative Examples 1 to 9.

(Measurement of Volume Fraction of Retained Austenite)

Next, the volume fraction of retained austenite was measured for the small roller test pieces 4 of Examples 1 to 20 and Comparative Examples 1 to 9. Specifically, the middle part of the small roller test piece 4 was electropolished from its outer surface to the depth of 0.1 mm, and then the volume fraction of retained austenite was measured with a common X-ray diffractometer. The volume fraction of retained austenite was obtained from the diffraction intensity ratio of retained austenite to martensite in the measured portion.

(Measurement of Bending Fatigue Strength)

Next, bending fatigue strength was measured for the test pieces 3 of Examples 1 to 20 and Comparative Examples 1 to 9. First, a reference test piece 3a was produced in order to obtain reference bending fatigue strength. Specifically, a reference steel material containing chemical components shown in Table 2 and corresponding to SCM420H defined in JIS G 4052 (2008) was prepared. The remainder other than the chemical components shown in Table 2 was Fe or incidental impurities. A reference test piece 3a for the Ono's rotary bending fatigue test was produced in a manner similar to that of Example 1.

Bending fatigue strength was measured for the test pieces 3 of Examples 1 to 20 and Comparative Examples 1 to 9 and the reference test piece 3a. Specifically, bending fatigue strength was measured at room temperature in the atmosphere with a common Ono's rotary bent fatigue testing machine. At this time, stress was repeatedly applied 107 times. The rotational speed was 3,000 rpm. The maximum stress value that did not cause fractures after the stress was applied 107 times was measured as bending fatigue strength. Double circle "⊚" shows that bending fatigue strength was particularly satisfactory, namely was more than 105% of bending fatigue strength of the reference test piece 3a. Circle "○" shows that bending fatigue strength was satisfactory, namely was 95% or more and 105% or less of bending fatigue strength of the reference test piece 3a. Cross "X" shows that bending fatigue strength was not satisfactory, namely was less than 95% of bending fatigue strength of the reference test piece 3a. In this case, the test pieces 3 with "⊚" or "○," i.e., the test pieces 3 whose bending fatigue strength was 95% or more of bending fatigue strength of the reference test piece 3a, were considered to have high bending fatigue strength.

(Measurement of Wear Resistance)

Next, wear resistance was measured using the small roller test pieces 4 of Examples 1 to 20 and Comparative Examples 1 to 9 and the large roller test piece 5 produced from the reference steel material.

First, a reference small roller test piece 4a was produced in order to obtain reference wear resistance. Specifically, a reference steel material containing the chemical components shown in Table 2 and corresponding to SCM420H defined in JIS G 4052 (2008) was prepared. The reference small roller test piece 4a for a roller pitting test was then produced in a manner similar to that of Example 1.

The roller pitting test was conducted for the small roller test pieces 4 of Examples 1 to 20 and Comparative Examples 1 to 9. Specifically, the small roller test piece 4 and the large roller test piece 5 were brought into contact with each other with a surface pressure of 2,600 MPa. The small roller test piece 4 was rotated at 1,560 rpm, and the maximum depth of wear of the small roller test piece 4 after the test was repeated 107 times was measured. The roller pitting test was conducted so that slipping would not occur between the small roller test piece 4 and the large roller test piece 5, and oil having a temperature of 100° C. was supplied at 2 liters per minute to the contact surface. A roller pitting test similar to that of the small roller test piece 4 was conducted for the reference small roller test piece 4a.

Double circle "⊚" shows that the maximum depth of wear was particularly satisfactory, namely was less than 80% of the maximum depth of wear of the reference small roller test piece 4a. Circle "○" shows that the maximum depth of wear was satisfactory, namely was 80% or more and 90% or less of the maximum depth of wear of the reference small roller test piece 4a. Cross "X" shows that the maximum depth of wear was not satisfactory, namely was more than 90% of the maximum depth of wear of the reference small roller test piece 4a. In this case, the small roller test pieces 4 with "⊚"

TABLE 2

| | C | Si | Mn | Cr | S | Al | N | Mo | P | O | Cu | Ni |
|---|---|---|---|---|---|---|---|---|---|---|---|---|
| REFERENCE STEEL MATERIAL | 0.20 | 0.25 | 0.75 | 1.10 | 0.015 | 0.030 | 0.013 | 0.20 | 0.012 | 0.0012 | — | — |

(mass %)

or "○," i.e., the small roller test pieces 4 whose maximum depth of wear was 90% or less of the maximum depth of wear of the reference small roller test piece 4a, were considered to have high wear resistance.

(Measurement Results)

Table 3 shows Fn1 and Fn2 and the measurement results of surface hardness, the volume fraction of retained austenite, bending fatigue strength, and wear resistance of Examples 1 to 18 and Comparative Examples 1 to 9.

TABLE 3

| | Fn1 | Fn2 | Vickers Hardness (HV) | Retained γ (%) | Bending Fatigue Strength | Wear Resistance |
|---|---|---|---|---|---|---|
| Example 1 | 14.5 | 2.50 | 755 | 20 | ⊚ | ⊚ |
| Comparative Example 1 | 13.9 | 3.25 | 760 | 14 | X | ⊚ |
| Example 2 | 14.4 | 4.08 | 765 | 18 | ⊚ | ⊚ |
| Example 3 | 15.1 | 2.88 | 733 | 24 | ⊚ | ⊚ |

TABLE 3-continued

|  | Fn1 | Fn2 | Vickers Hardness (HV) | Retained γ (%) | Bending Fatigue Strength | Wear Resistance |
| --- | --- | --- | --- | --- | --- | --- |
| Example 4 | 14.9 | 3.12 | 747 | 22 | ◎ | ◎ |
| Example 5 | 14.5 | 2.60 | 766 | 19 | ◎ | ◎ |
| Comparative Example 2 | 16.8 | 3.64 | 670 | 30 | X | ○ |
| Example 6 | 15.3 | 2.75 | 725 | 26 | ◎ | ◎ |
| Example 7 | 14.1 | 2.99 | 780 | 16 | ◎ | ◎ |
| Comparative Example 3 | 12.7 | 2.60 | 745 | 11 | ○ | X |
| Comparative Example 4 | 14.2 | 4.10 | 757 | 17 | X | ◎ |
| Example 8 | 14.8 | 4.20 | 748 | 20 | ◎ | ◎ |
| Example 9 | 14.8 | 1.50 | 750 | 19 | ◎ | ◎ |
| Example 10 | 14.7 | 4.25 | 755 | 19 | ◎ | ◎ |
| Example 11 | 15.2 | 1.76 | 731 | 24 | ◎ | ◎ |
| Comparative Example 5 | 14.0 | 2.03 | 702 | 15 | X | X |
| Example 12 | 15.0 | 4.06 | 740 | 23 | ◎ | ◎ |
| Comparative Example 6 | 15.9 | 3.30 | 678 | 29 | X | ○ |
| Example 13 | 15.5 | 3.85 | 723 | 27 | ◎ | ◎ |
| Example 14 | 13.9 | 3.92 | 795 | 13 | ◎ | ◎ |
| Comparative Example 7 | 13.6 | 3.78 | 748 | 12 | ◎ | X |
| Comparative Example 8 | 14.0 | 5.78 | 742 | 15 | X | ◎ |
| Example 15 | 15.0 | 4.35 | 740 | 23 | ◎ | ◎ |
| Example 16 | 14.5 | 1.20 | 766 | 19 | ◎ | ◎ |
| Comparative Example 9 | 14.1 | 1.12 | 695 | 17 | X | X |
| Example 17 | 14.6 | 2.85 | 760 | 20 | ◎ | ◎ |
| Example 18 | 14.9 | 3.30 | 752 | 24 | ◎ | ◎ |

Table 4 shows the CP for diffusion and the measurement results of surface hardness, the volume fraction of retained austenite, bending fatigue strength, and wear resistance of Examples 1, 19, and 20. The measurement results of surface hardness, the volume fraction of retained austenite, bending fatigue strength, and wear resistance of Example 1 shown in Table 4 are the same as those shown in Table 3.

TABLE 4

|  | CP | Vickers Hardness (HV) | Retained γ (%) | Bending Fatigue Strength | Wear Resistance |
| --- | --- | --- | --- | --- | --- |
| Example 1 | 0.90 | 755 | 20 | ◎ | ◎ |
| Example 19 | 1.10 | 682 | 28 | ○ | ○ |
| Example 20 | 0.70 | 721 | 13 | ○ | ○ |

In Table 1, the numerical values shown in the shaded boxes are the numerical values that are out of the ranges of the chemical component contents defined in the above embodiment. In Table 2 as well, regarding Fn1 and Fn2 defined by the expressions (1) and (2), the numerical values shown in the shaded boxes are the numerical values that are out of the ranges of Fn1 and Fn2 defined in the above embodiment. Regarding the Vickers hardness and the volume fraction of retained austenite as well, the numerical values shown in the shaded boxes are also the numerical values that are out of the ranges of the Vickers hardness and the volume fraction of retained austenite defined in the above embodiment.

The measurement results shows, in all of Examples 1 to 20, Vickers hardness was within the range of 680 HV or more and 800 HV or less and the volume fraction of retained austenite was within the range of 13% or more and 28% or less. Moreover, in all of Examples 1 to 18, bending fatigue strength was most satisfactory (bending fatigue strength was more than 105% of bending fatigue strength of the reference test piece 3a) and wear resistance was most satisfactory (the maximum depth of wear was less than 80% of the reference depth of wear). It was thus verified that CVT sheaves that are satisfactory in terms of surface hardness, the volume fraction of retained austenite, bending fatigue strength, and wear resistance can be manufactured from steel materials for CVT sheaves containing chemical components in appropriate ranges as in Examples 1 to 18.

It was also verified that CVT sheaves that are satisfactory in terms of surface hardness, the volume fraction of retained austenite, bending fatigue strength, and wear resistance can be manufactured even if Cu and Ni are added to steel materials for CVT sheaves containing chemical components in appropriate ranges as in Examples 17 and 18.

It was also verified that CVT sheaves that are satisfactory in terms of surface hardness, the volume fraction of retained austenite, bending fatigue strength, and wear resistance can be manufactured even if steel materials for CVT sheaves containing the chemical components of Example 1 is gas carburized with CP of 0.70 mass % or more and 1.10 mass % or less as in Examples 1, 19, and 20. In Examples 19 and 20, neither bending fatigue strength nor wear resistance was most satisfactory, but it was confirmed that CVT sheaves that are sufficiently appropriate for use can be manufactured from Examples 19 and 20.

On the other hand, in Comparative Example 1 in which the Si content (0.40 mass %) is higher than 0.30 mass %, bending fatigue strength was not satisfactory. Reduction in bonding fatigue strength seemed to be caused because a large amount of Si oxide was produced at the surface and the depth of an abnormal carburized layer was increased.

In Comparative Example 2 in which the Cr content (2.10 mass %) is higher than 1.90 mass % and thus Fn1 (=16.8) is larger than 15.5, the volume fraction of retained austenite (30%) was higher than 28%, and Vickers hardness (670 HV) was less than 680 HV. Accordingly, bending fatigue strength was not satisfactory and wear resistance was not most satisfactory. The reason why bending fatigue strength was not satisfactory and wear resistance was not most satisfactory seems to be that, with Fn1 being larger than 15.5, an excessive amount of retained austenite was produced and Vickers hardness (670 HV) became less than 680 HV.

Similarly, in Comparative Example 6 in which Fn1 (=15.9) is larger than 15.5, the volume fraction of retained austenite (29%) was higher than 28%, and Vickers hardness (678 HV) was less than 680 HV. Accordingly, bending fatigue strength was not satisfactory and wear resistance was not most satisfactory. This seems to be because the volume fraction of retained austenite was too high.

In Comparative Example 3 in which the Cr content (1.55 mass %) is less than 1.80 mass % and thus Fn1 (=12.7) is less than 13.9, the volume fraction of retained austenite (11%) was less than 13%. Accordingly, bending fatigue strength was not most satisfactory and wear resistance was not satisfactory. The reason for this seems to be as follows. Since Fn1 was less than 13.9, the volume fraction of retained austenite was too low. Accordingly, there was not a sufficient amount of retained austenite in the sliding surface, and a sufficient amount of strain-induced martensite was not produced by a surface pressure, whereby wear resistance was reduced. Moreover, since the Cr content was low and bending fatigue strength was not improved so much, bending fatigue strength could not be improved to the most satisfactory level.

Similarly, in Comparative Example 7 in which Fn1 (=13.6) is less than 13.9, the volume fraction of retained austenite (12%) was less than 13%. Accordingly, wear resistance was not satisfactory. This seems to be because the volume fraction of retained austenite was too low.

In Comparative Example 4 in which the Al content (0.041 mass %) is higher than 0.035 mass %, bending fatigue strength was not satisfactory. Reduction in bonding fatigue strength seemed to be caused because coarse oxide was formed due to an excessive amount of Al. In Comparative Example 8 in which Fn2 (=5.78) is larger than 4.35, bending fatigue strength was not satisfactory. In Comparative Example 5 in which the N content (0.007 mass %) is less than 0.008 mass % and Comparative Example 9 in which the Al content (0.014 mass %) is less than 0.015 mass % and thus Fn2 (=1.12) is less than 1.20, neither bending fatigue strength nor wear resistance was satisfactory. This seems to be because the grain size was not sufficiently refined due to the excessively small amount of Al or N or Fn2 not included in the predetermined range.

According to the measurement results of Examples 1 to 18, in the case where $13.9 \leq Fn1 \leq 15.3$ is satisfied (Examples 1 to 12 and 14 to 18), the volume fraction of retained austenite was 13% or more and 26% or less. In the case where $14.1 \leq Fn1 \leq 15.2$ is satisfied (Examples 1 to 5, 7 to 12, and 15 to 18), the volume fraction of retained austenite was 16% or more and 24% or less. In the case where $14.4 \leq Fn1 \leq 14.8$ is satisfied (Examples 1, 2, 5, 8 to 10, 16, and 17), the volume fraction of retained austenite was 18% or more and 20% or less.

[Modifications]

The embodiments and examples disclosed herein are merely by way of example in all respects and should not be construed as restrictive.

For example, 18 kinds of steel materials for CVT sheaves having different compositions were used in the above examples. However, the present disclosure is not limited to this. In the present disclosure, the steel material for CVT sheaves is not limited to the steel materials for CVT sheaves containing the chemical components described in the examples, but may be any steel material for CVT sheaves containing the chemical components in the ranges described in the present disclosure.

In the above examples, the steel material for CVT sheaves was heat treated according to the three heat patterns shown in FIGS. 2, 6, and 7. However, the present disclosure is not limited to this. In the present disclosure CVT sheaves may be manufactured from the steel material for CVT sheaves according to a heat pattern other than the three heat patterns shown in FIGS. 2, 6, and 7.

The above embodiments and examples are described with respect to an example in which the steel material for CVT sheaves is hot forged. However, the present disclosure is not limited to this. For example, the steel material for CVT sheaves may be cold forged. In this case as well, the steel material for CVT sheaves can be satisfactorily formed into a predetermined shape as it has great workability such as machinability.

The invention claimed is:

1. A steel material for a CVT sheave, the steel material consisting of the following components, in terms of mass percent (mass %):
    carbon (C): 0.15 mass % or more and 0.20 mass % or less,
    silicon (Si): 0.21 mass % or more and 0.30 mass % or less,
    manganese (Mn): 0.70 mass % or more and 0.90 mass % or less,
    sulfur (S): 0.010 mass % or more and 0.025 mass % or less,
    chromium (Cr): 1.80 mass % or more and 1.90 mass % or less,
    aluminum (Al): 0.015 mass % or more and 0.035 mass % or less,
    nitrogen (N): 0.008 mass % or more and 0.017 mass % or less, and
    optionally at least one member selected from the group consisting of copper (Cu) and nickel (Ni);
where
    a remainder of the steel material is iron (Fe) and incidental impurities, and of the incidental impurities, phosphorus (P) and oxygen (O) contents are as follows:
    phosphorus (P): 0.030 mass % or less, and
    oxygen (O): 0.0020 mass % or less; wherein
    the contents of the Si, Mn, and Cr components satisfy:
        the above mass % ranges, and
        the following expression (1):

$$Fn1 = 7 \times Cr - 6 \times Si + 4 \times Mn \qquad (1)$$

where
        Fn1 satisfies: $13.9 \leq Fn1 \leq 15.5$, and
        "Cr," "Si," and "Mn" represent the Cr, Si, and Mn contents in mass %; and
    the contents of the Al and N components satisfy:
        the above mass % ranges, and
        the following expression (2):

$$Fn2 = Al \times N \times 10^4 \qquad (2)$$

where
        Fn2 satisfies: $1.20 \leq Fn2 \leq 4.35$, and
        "Al" and "N" represent the Al and N contents in mass %.

2. The steel material for a CVT sheave according to claim 1, wherein
    the Cu is present at a content of no more than 0.30 mass %, and/or
    the Ni is present at a content of no more than 0.25 mass %.

3. A CVT sheave formed by using a steel material for a CVT sheave as raw steel, wherein
    Vickers hardness in a surface region from a sliding surface on which a CVT belt slides to 100 μm in a depth direction is 680 HV or more and 800 HV or less,
    a volume fraction of retained austenite in the surface region is 13% or more and 28% or less, and
    the steel material consists of the following components, in terms of mass percent (mass %):
    carbon (C): 0.15 mass % or more and 0.20 mass % or less,
    silicon (Si): 0.21 mass % or more and 0.30 mass % or less,
    manganese (Mn): 0.70 mass % or more and 0.90 mass % or less,
    sulfur (S): 0.010 mass % or more and 0.025 mass % or less,
    chromium (Cr): 1.80 mass % or more and 1.90 mass % or less,
    aluminum (Al): 0.015 mass % or more and 0.035 mass % or less, and
    nitrogen (N): 0.008 mass % or more and 0.017 mass % or less, where
    a remainder of the steel material is iron (Fe) and incidental impurities, and of the incidental impurities, phosphorus (P) and oxygen (O) contents are as follows:

phosphorus (P): 0.030 mass % or less, and
oxygen (O): 0.0020 mass % or less; wherein
the contents of the Si, Mn, and Cr components satisfy:
the above mass % ranges, and
the following expression (1):

$$Fn1 = 7 \times Cr - 6 \times Si + 4 \times Mn \quad (1)$$

where
Fn1 satisfies: $13.9 \leq Fn1 \leq 15.5$, and
"Cr," "Si," and "Mn" represent the Cr, Si, and Mn contents in mass %; and the contents of the Al and N components satisfy:
the above mass % ranges, and
the following expression (2):

$$Fn2 = Al \times N \times 10^4 \quad (2)$$

where
Fn2 satisfies: $1.20 \leq Fn2 \leq 4.35$, and
"Al" and "N" represent the Al and N contents in mass %.

4. A CVT sheave formed by using a steel material for a CVT sheave as raw steel, wherein
Vickers hardness in a surface region from a sliding surface on which a CVT belt slides to 100 μm in a depth direction is 680 HV or more and 800 HV or less,
a volume fraction of retained austenite in the surface region is 13% or more and 28% or less, and
the steel material consists of the following components, in terms of mass percent (mass %):
carbon (C): 0.15 mass % or more and 0.20 mass % or less,
silicon (Si): 0.21 mass % or more and 0.30 mass % or less,
manganese (Mn): 0.70 mass % or more and 0.90 mass % or less,
sulfur (S): 0.010 mass % or more and 0.025 mass % or less,
chromium (Cr): 1.80 mass % or more and 1.90 mass % or less,
aluminum (Al): 0.015 mass % or more and 0.035 mass % or less,
nitrogen (N): 0.008 mass % or more and 0.017 mass % or less, and
at least one member selected from the group consisting of copper (Cu) and nickel (Ni), where, when present, the Cu is present at a content of no more than 0.30 mass %, and, when present, the Ni is present at a content of no more than 0.25 mass %, where
a remainder of the steel material is iron (Fe) and incidental impurities, and of the incidental impurities, phosphorus (P) and oxygen (O) contents are as follows:
phosphorus (P): 0.030 mass % or less, and
oxygen (O): 0.0020 mass % or less; wherein
the contents of the Si, Mn, and Cr components satisfy:
the above mass % ranges, and
the following expression (1):

$$Fn1 = 7 \times Cr - 6 \times Si + 4 \times Mn \quad (1)$$

where
Fn1 satisfies: $13.9 \leq Fn1 \leq 15.5$, and
"Cr," "Si," and "Mn" represent the Cr, Si, and Mn contents in mass %; and the contents of the Al and N components satisfy:
the above mass % ranges, and
the following expression (2):

$$Fn2 = Al \times N \times 10^4 \quad (2)$$

where
Fn2 satisfies: $1.20 \leq Fn2 \leq 4.35$, and
"Al" and "N" represent the Al and N contents in mass %.

5. A method for manufacturing a CVT sheave, comprising:
processing the steel material for a CVT sheave according to claim 1 into a predetermined shape; and
gas carburizing a processed workpiece with a carbon potential (CP) of 0.70 mass % or more and 1.10 mass % or less.

6. A method for manufacturing a CVT sheave, comprising:
processing the steel material for a CVT sheave according to claim 2 into a predetermined shape; and
gas carburizing a processed workpiece with a carbon potential (CP) of 0.70 mass % or more and 1.10 mass % or less.

7. The CVT sheave formed according to claim 3, wherein the silicon (Si) mass percent is 0.25 mass % or more and 0.30 mass % or less.

8. The CVT sheave formed according to claim 4, wherein the silicon (Si) mass percent is 0.25 mass % or more and 0.30 mass % or less.

9. The CVT sheave formed according to claim 3, wherein the Vickers hardness is 720 HV or more and 800 HV or less.

10. The CVT sheave formed according to claim 3, wherein the Vickers hardness is 720 HV or more and 800 HV or less.

\* \* \* \* \*